United States Patent
Ning et al.

(10) Patent No.: US 12,452,092 B2
(45) Date of Patent: Oct. 21, 2025

(54) INFORMATION PROCESSING METHOD, APPARATUS, TERMINAL AND STORAGE MEDIUM

(71) Applicant: Beijing Zitiao Network Technology Co., Ltd., Beijing (CN)

(72) Inventors: Liaoyuan Ning, Beijing (CN); Cong Wang, Beijing (CN); Xinru Zhang, Beijing (CN); Guangyu Zhang, Beijing (CN); Ying Xiao, Beijing (CN); Geliang Tian, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/565,935

(22) PCT Filed: Jul. 22, 2022

(86) PCT No.: PCT/CN2022/107355
§ 371 (c)(1),
(2) Date: Nov. 30, 2023

(87) PCT Pub. No.: WO2023/001279
PCT Pub. Date: Jan. 26, 2023

(65) Prior Publication Data
US 2024/0267243 A1    Aug. 8, 2024

(30) Foreign Application Priority Data
Jul. 23, 2021  (CN) .......................... 202110838724.3

(51) Int. Cl.
*H04L 12/18*    (2006.01)
*H04L 51/02*    (2022.01)
*H04L 51/224*   (2022.01)

(52) U.S. Cl.
CPC .......... *H04L 12/1813* (2013.01); *H04L 51/02* (2013.01); *H04L 51/224* (2022.05)

(58) Field of Classification Search
CPC ... H04L 12/1813; H04L 51/02; H04L 51/224; H04L 12/185; G06Q 10/103
See application file for complete search history.

(56) References Cited

U.S. PATENT DOCUMENTS

2010/0299664 A1    11/2010  Taylor et al.
2011/0238456 A1     9/2011  Ray et al.
(Continued)

FOREIGN PATENT DOCUMENTS

CN    101800951 A    8/2010
CN    105306600 A    2/2016
(Continued)

OTHER PUBLICATIONS

International Search Report and Written Opinion for International Application No. PCT/CN2022/107356, mailed Oct. 18, 2022, 14 Pages.

(Continued)

*Primary Examiner* — Soe Hlaing
(74) *Attorney, Agent, or Firm* — Astute IP Law Group

(57) ABSTRACT

Provided in the present disclosure are an information processing method and apparatus, and a terminal and a storage medium. In some embodiments, the information processing method provided in the present disclosure comprises: in response to inputting first information of a target object into a related page of the target object, sending the first information to a data system, so as to update association information of the target object in the data system; and determining a communication group associated with the target object, and sending a first notification message to the communication group associated with the target object, wherein (Continued)

the first notification message comprises the first information. By means of the method provided in the present disclosure, the collaboration efficiency may be improved.

18 Claims, 3 Drawing Sheets

(56) References Cited

U.S. PATENT DOCUMENTS

| | | | |
|---|---|---|---|
| 2012/0197984 | A1 | 8/2012 | Rao |
| 2018/0198831 | A1 | 7/2018 | Calcaterra et al. |
| 2019/0129974 | A1* | 5/2019 | Choi .................. G06F 16/1734 |
| 2020/0412679 | A1* | 12/2020 | Han ........................ H04L 51/52 |

FOREIGN PATENT DOCUMENTS

| CN | 108616445 | A | 10/2018 |
|---|---|---|---|
| CN | 109522533 | A | 3/2019 |
| CN | 110635921 | A | 12/2019 |
| CN | 110839104 | A | 2/2020 |
| CN | 111147268 | A | 5/2020 |
| CN | 111178820 | A | 5/2020 |
| CN | 111326245 | A | 6/2020 |
| CN | 111565112 | A | 8/2020 |
| CN | 111913629 | A | 11/2020 |
| CN | 112214971 | A | 1/2021 |
| CN | 112632375 | A | 4/2021 |
| CN | 112994906 | A | 6/2021 |
| CN | 113014472 | A | 6/2021 |
| CN | 113098700 | A | 7/2021 |
| CN | 113111647 | A | 7/2021 |
| CN | 114024927 | A | 2/2022 |

OTHER PUBLICATIONS

Office Action for Chinese Patent Application No. CN202110839645.4, mailed Jul. 1, 2023, 16 Pages.
Office Action for Chinese Patent Application No. CN202110839645.4, mailed Dec. 22, 2022, 16 Pages.
Written Opinion for International Application No. PCT/CN2022/107355, mailed Sep. 16, 2022, 11 Pages.
International Search Report in PCT/CN2022/107355, mailed Sep. 16, 2022, 4 pages.
Office Action in CN202110838724.3, mailed Dec. 26, 2022, 8 pages.
Office Action in CN202110838724.3, mailed Apr. 24, 2023, 7 pages.

* cited by examiner

The project bound successfully January 1, 2021

XXX Project (click to open an information page)

The communication group is already bounded to the XXX Project; members of the client team will post the progress of the project synchronously in the group subsequently; Support from all will be appreciated!

Info of the project
Nickname of the project: XXX     Type of the project: XXX
Scale of the project: XXX     Location: XX Project profile: XXXXX Owner of the project: XX
Project service team:
@XX @XX @XX Click to view the page with details Notes: should have any questions, please contact XX

FIG. 5

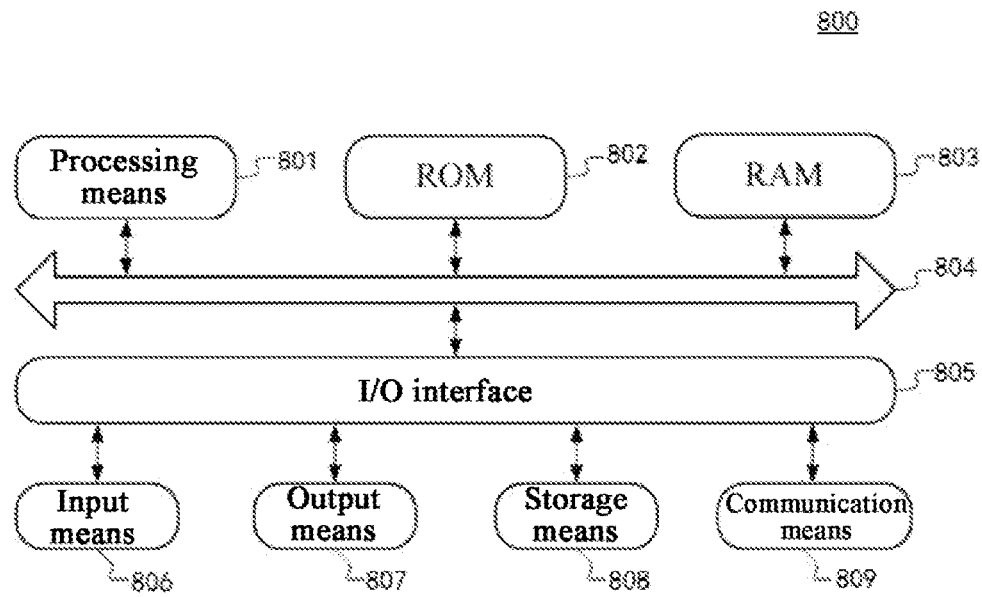

FIG. 6

INFORMATION PROCESSING METHOD, APPARATUS, TERMINAL AND STORAGE MEDIUM

CROSS REFERENCE TO RELATED APPLICATION(S)

The present application is a national stage application filed under 35 U.S.C. 371 based on International Patent Application No. PCT/CN2022/107355, filed on Jul. 22, 2022, which claims the priority of the Chinese patent application No. 202110838724.3 entitled "Information Processing Method, Apparatus, Terminal and Storage Medium" filed on the filing date Jul. 23, 2021, and claims priority to the Chinese patent application, the disclosures of which are incorporated herein by reference in their entireties.

FIELD

The present disclosure relates to the technical field of computers, and particularly to an information processing method, apparatus, terminal and storage medium.

BACKGROUND

In some technologies, a project information system is used to store project information of a company, and a user manually updates the information stored in the project information system. After the relevant information of the project stored in the project information system is updated, the user may view the relevant update by logging into the project information system.

SUMMARY

The present disclosure provides an information processing method, apparatus, terminal and storage medium.

The present disclosure employs the following technical solutions.

In some embodiments, the present disclosure provides an information processing method, comprising:
  in response to inputting first information of a target object into a related page of the target object, sending the first information to a data system to update association information of the target object in the data system;
  determining a communication group associated with the target object, and sending a first notification message to the communication group associated with the target object;
  wherein the first notification message includes the first information.

In some embodiments, the present disclosure provides an information processing apparatus, comprising:
  a sending unit for sending the first information to a data system in response to inputting first information of a target object into a related page of the target object, to update association information of the target object in the data system;
  a control unit for determining a communication group associated with the target object, and sending a first notification message to the communication group associated with the target object,
  wherein the first notification message comprises the first information.

In some embodiments, the present disclosure provides a terminal, comprising: at least one memory and at least one processor;
wherein the at least one memory is used for storing program code, and the at least one processor is used for calling the program code stored by the at least one memory to perform the above method.

In some embodiments, the present disclosure provides a computer-readable storage medium for storing program code that, when executed by a processor, causes the processor to perform the above method.

The present disclosure provides an information processing method, comprising: in response to inputting first information of a target object into a related page of the target object, sending the first information to a data system, so as to update association information of the target object in the data system; determining a communication group associated with the target object, and sending a first notification message to the communication group associated with the target object; wherein the first notification message comprises the first information. The method provided in the embodiments of the present disclosure can ensure the consistency of information about collaborative users and improve the collaboration efficiency.

BRIEF DESCRIPTION OF THE DRAWINGS

The above and other features, advantages, and aspects of embodiments of the present disclosure will become more apparent with reference to the following figures and detailed embodiments. Throughout the figures, the same or similar reference numerals indicate the same or similar elements. It should be understood that the figures are diagrammatic and that elements are not necessarily drawn to scale.

FIG. 5 is a schematic diagram of a second notification message according to an embodiment of the present disclosure.

FIG. 6 is a schematic structural diagram of an electronic device according to an embodiment of the present disclosure.

DETAILED DESCRIPTION OF EMBODIMENTS

Figure 1:
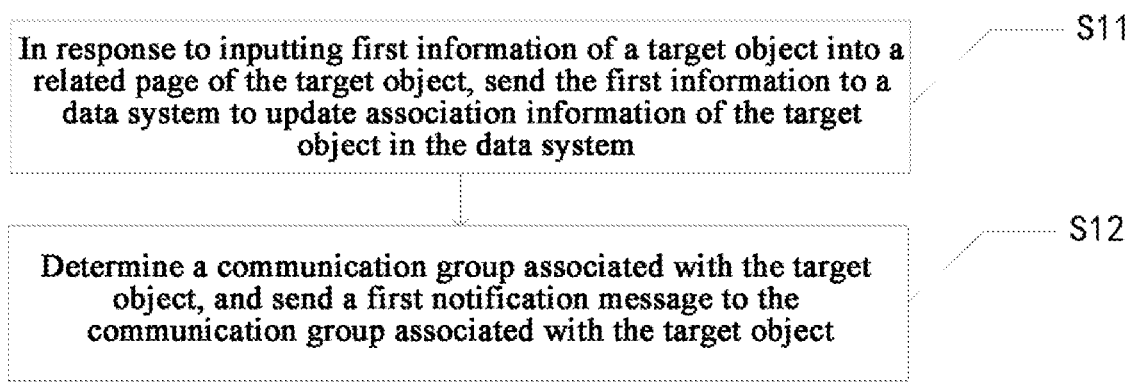
FIG. 1 is a flowchart of an information processing method according to an embodiment of the present disclosure.

Hereinafter, embodiments of the present disclosure will be described in more detail with reference to the accompanying drawings. While certain embodiments of the present disclosure have been illustrated in the accompanying drawings, it is to be understood that the disclosure may be embodied in various forms and should not be construed as being limited to the embodiments set forth herein; rather, these embodiments are provided to help understand the present disclosure more thoroughly and completely. It should be understood that the drawings and examples of the present disclosure are for illustrative purposes only and are not intended to limit the scope of the present disclosure.

It should be understood that the various steps recited in method embodiments of the present disclosure may be performed in a different order and/or in parallel. Moreover, the method embodiments may comprise additional steps and/or omit performing the steps shown. The scope of the present disclosure is not limited in this respect.

As used herein, the terms "comprise", and variations thereof are open-ended terms, i.e., "comprise, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that concepts such as "first" and "second" mentioned in the present disclosure are only intended to distinguish between different devices, modules, or units and are not intended to limit the order or interdependence of the functions performed by the devices, modules, or units.

It needs to be appreciated that the modifier "a" or "an" in the present disclosure are intended to be illustrative and not restrictive, and those skilled in the art should understand that the modifier should be understood as "one or more" unless the context clearly indicates otherwise. "A and/or B" in the present disclosure is meant to include three cases in parallel: A; B; A and B, i.e., represents at least one of A and B.

The names of messages or information interacted between devices in embodiments of the present disclosure are for illustrative purposes only and are not intended to limit the scope of such messages or information.

Hereinafter, solutions provided in embodiments of the present disclosure will be described in detail with reference to the accompanying drawings.

A project management system is used for storing information about projects in a company, and a user may update the project information stored in the project management system by means of a tool; after the information stored in the project management system is updated, for example, after the information about a project in a certain company is updated, an employee related to the project may view the updated data by logging in to the project management system, and may also forward the updated content to colleagues by means of copying, screenshots, etc. so as to notify other colleagues that the project information has an update. This manner is inconvenient to operate and provides a poor user experience. Furthermore, when a plurality of employees are responsible for a project collaboratively, when the project information is updated, there might be cases in which employees fail to log into the project management system to view the update in time, and it is difficult to ensure the consistency of the project information understood by a plurality of employees, which is not conducive to collaborative work.

An information processing method is provided in embodiments of the present disclosure; in some embodiments, the information processing method may be used for a terminal which is communicatively connected to a server; the server may be, for example, a server of a project management information system, but is certainly not limited to the server of the project management information system; the terminal may be, for example, a terminal such as a mobile phone, a tablet computer, a computer, etc. or a virtual software client; in other embodiments, the information processing method may also be executed by different executors in collaboration, for example, the information processing method may be executed by a certain module in the client in collaboration with another module in the server. As shown in FIG. 1, FIG. 1 is a flowchart of an information processing method according to an embodiment of the present disclosure, comprising the following steps.

S11: in response to inputting first information of a target object into a related page of the target object, sending the first information to a data system to update association information of the target object in the data system.

In some embodiments, the target object may be a project within a company, for example a product development project. The related page of the target object may be, for example, an information presentation page or an information recording page about the project in the project management system, and the related page may be accessed through an applet. The data system may be, for example, a server communicatively connected with a client, and the data system may also be a software system in the server, such as a project management system; the target object may be, for example, a certain project and a certain task in a company; certainly, the target object may be not limited to the above examples; information about the target object may be input in the related page of the target object, for example, the first information may be a change to already-existing information about the target object, and may also be added association information of the target object; after the current user inputs the first information in the related page, namely, the association information of the target object in the data system is added or modified, whereupon the association information of the target object in the data system needs to be synchronously updated; therefore, the first information is sent to update the association information of the target object, and the first information may correspond to the update performed according to the first information.

S12: determining a communication group associated with the target object, and sending a first notification message to the communication group associated with the target object.

In some embodiments, the first notification message includes the first information. In some embodiments, the communication group is an instant messaging group, e.g., may be a communication group in instant messaging software. In some embodiments, the first notification message is used for displaying the first information, the first notification message may only include the first information, and may also include information associated with the first information, for example, the first notification message may be displayed in the communication group in the form of a message card, the message card has a message display area and an association information area, the message display area displays the first information, the association information area displays the information associated with the first information, and the association information may include, for example, an introduction of the target object, a sending time, a sending user, and a comparison of the association information of the target object before and after updating according to the first information.

In some embodiments of the present disclosure, the association information of the target object in the data system may be updated via the related page of the target object, and after the first information is input, a chatbot in the communication group may send the first notification message to the communication group associated with the target object, so that the users in the associated communication group may view the update of the association information of the target object in real time, rather than that members of the communication group need to respectively enter the system to view the update. More importantly, the information which can be seen by the members of the communication group is consistent, thereby avoiding the occurrence of collaboration problems caused because different members fail to communicate with one another instantaneously about the association information of the target object.

By way of example, the present method is used for an instant messaging client; project information about an project is stored in the data system; the target object is project A in a certain company; when a user inputs the first information about the project A in an applet of the instant messaging client, since a communication interface between the applet and the data system is pre-connected, the applet sends the first information to the data system via the pre-connected communication interface to update relevant information about the project A in the data system; in addition, the applet of the instant messaging client determines a communication group bound by the project A according to the project A as the target object, and a first message including the first information is forwarded to the project A-bound communication group by the chatbot in the communication group. Furthermore, the chatbot will process the forwarded first message into the form of a message card, and the members of the communication group may synchronously see the information, so that when the information about the project A is updated, each user does not need to log in the data system respectively to view, thereby ensuring the synchronization of the understanding of the information of project A by the members, and helping improve the collaboration.

In some embodiments of the present disclosure, the related page of the target object comprises: a page of the target object displayed in the applet; or, a page of the target object in the data system. In some embodiments, the applet may be, for example, an applet in an IM client, and may also be a functional module in other applications; the display of the target object via the applet may help the user access the a related page of the target object at any time. In other embodiments, the related page of the target object may be a page of the target object in the data system, and the related page of the target object in the data system may be accessed by a browser accessing the data system.

In some embodiments of the present disclosure, after the first notification message is triggered, an information page of the target object in the data system is opened and positioned to a position where an update corresponding to the first notification message lies. In some embodiments, the members in the communication group may trigger the first notification message by clicking the first notification message; after the first notification message is triggered, the information page of the target object in the data system is opened; the information page of the target object may be used for displaying association information of the target object, and the position where the update corresponding to the first notification message lies is determined; the update corresponding to the first notification message refers to an update performed according to the first information; for example, if the first information adds information A to the association information of the target object, then the added information A is the update corresponding to the first notification message; after the first notification message is triggered, the information page of the target object is opened and positioned to the position of information A. With the information page being positioned to the position where the update corresponding to the first notification message lies, the user may conveniently view other messages related to the updated message and conveniently trace back to all information records of the target object. In some embodiments, the first notification message is displayed in the form of a message card, the message card has a link therein, and an association information page of the target object in the data system is opened by clicking the link in the message card and is positioned to the position where the update corresponding to the first notification message lies. In other embodiments, the first notification message may be triggered by double-clicking the first notification message, or by presetting a gesture operation on the first notification message; alternatively, the first notification message may be triggered by clicking a control corresponding to the first notification message, for example, the first notification message is clicked via a right click to display a second control, and the first notification message is triggered after the second control is clicked.

In some embodiments of the present disclosure, the determining a communication group associated with the target object, and sending a first notification message to the communication group associated with the target object comprises: determining whether a communication group associated with the target object exists; if a communication group associated with the target object does not exist, creating a first class of communication group associated with the target object and sending the first notification message; if a communication group associated with the target object exists, sending the first notification message to the communication group associated with the target object.

In some embodiments, when the first information is input into the related page of the target object, the communication group associated with the target object may not be established yet, i.e., the first information may be information about the target object which is input in the related page of the target object for the first time. Therefore, it is necessary to first determine whether a communication group associated with the target object exists; if a communication group associated with the target object does not exist, the communication group of the target object may be automatically created; the automatically-created communication group is the first class of communication group; when the communication group is created, a user associated with the target object may be automatically pulled into the communication group. Candidate users may also be displayed, selected candidate users may be pulled into the communication group, and then the first notification message may be sent in the created communication group. In some embodiments, the first class of communication group is created by a chatbot. If a communication group associated with the target object exists, the first notification message may be sent directly to the communication group associated with the target object.

In some embodiments of the present disclosure, whether the target object is a preset object is determined in response to inputting the first information of the target object into the related page of the target object. If the target object is the preset object, the communication group associated with the target object is determined. In some embodiments, after the first information about the target object is input into the related page, whether the target object is the preset object is judged first. If the target object is the preset object, the communication group associated with the target object is determined, otherwise, the communication group associated with the target object is not determined, and other operations are not performed. In some embodiments, the preset object is provided, and the preset object may be an important object, such as an important internal project, and the first notification message is sent only when the target object is an important object, thereby reducing unimportant reminders.

In some embodiments of the present disclosure, the determining a communication group associated with the target object, and sending a first notification message to the communication group associated with the target object comprises: determining whether a communication group associated with the target object exists; if a communication group associated with the target object does not exist, creating a first class of communication group associated with the target object and sending the first notification message to the created communication group; if a communication group associated with the target object exists, sending the first notification message to the communication group associated with the target object.

In some embodiments, the target object may not have an associated communication group. At this time, a communication group associated with the target object may be created, i.e., the first information may be input first, and then the communication group is created, which is different from the manner of creating the communication group before sending the information. Furthermore, the created communication group may be automatically associated with the target object of the first information, so that a manual association by the user may not be required.

In some embodiments of the present disclosure, if a communication group associated with the target object exists, the method further comprises: determining whether a current user inputting the first information has already joined the communication group associated with the target object, and if NO, attempting to add the current user to the communication group associated with the target object.

In some embodiments, in a case where the current user has joined the communication group associated with the target object, this indicates that the current user has a privilege to send a message in the communication group, and thus the first notification message may be directly sent to the communication group; in a case where the current user has not joined the communication group associated with the target object, since the first information is information about the target object and the current user is probably related to the target object, the current user probably needs to discuss matters related to the target object together with other users, whereupon an attempt is made to add the current user to the communication group.

In some embodiments of the present disclosure, the attempting to add the current user to the communication group associated with the target object comprises: if the communication group associated with the target object is a communication group created by a chatbot, then adding the current user to the communication group associated with the target object. Alternatively, the chatbot may be a preset artificial intelligence program, and the communication group created by the chatbot is not a communication group created by a user. At this time, the communication group may not have an administrator in charge of the group, and therefore the current user may be directly added to the communication group.

In some embodiments, if the communication group associated with the target object is a communication group created by a user and the communication group is provided to be in an open state, the current user is added to the communication group associated with the target object. Alternatively, the communication group created by a user may be a communication group created by a natural person user, and the open state may be a joinable state, such as a state in which a user may join in without authentication. At this time, although the communication group created by a user is not a communication group created by a chatbot, the current user may directly join the communication group associated with the target object without authentication.

In some embodiments, if the communication group associated with the target object is a communication group created by a user and the communication group is provided to be in a closed state, reminding information is displayed. The reminding information is used for prompting at least one of the following information: failure to add the current user to the communication group, group administrator information, and an approval entrance. In some embodiments, the closed state means that a user may not directly join the communication group, whereupon the reminding information is sent out to remind the failure to join the communication group; the reminding information may also display contact information of the group administrator of the communication group, so that the current user may contact the group administrator to join the communication group; the reminding information may also display the approval entrance, wherein the approval entrance is an entrance for applying for joining the group, and application information for applying for joining the communication group may be sent to the group administrator by submitting an application in the approval entrance.

In some embodiments of the present disclosure, before responding to inputting the first information of the target object into the related page of the target object, the method further comprises: in response to the current user having a first privilege about the target object, determining whether a communication group associated with the target object exists; if NO, displaying a group creation identifier, and creating the communication group associated with the said target object in response to a triggering operation on the said group creation identifier; or, if YES, displaying one of an enter-group identifier or a join-group identifier based on a belonging relationship between the current user and the communication group and feature information of the communication group, the enter-group identifier being used for entering the communication group, and the join-group identifier being used for joining the communication group.

In some embodiments, the first privilege may be a privilege to create the communication group associated with the target object. For example, in a case where the current user is an administrator of the data system, it is determined that the current user has the first privilege. If the current user has the first privilege, judgment is made as to whether a communication group associated with the target object already exists. If a communication group associated with the target object does not exist, displaying a group creation identifier for creating the communication group, and creating the communication group associated with the target object after the group creation identifier is triggered, wherein the communication group may be created by a chatbot. If a communication group associated with a target object already exists, a belonging relationship between the current user and the communication group and feature information about the communication group need to be further determined; based on the belonging relationship and the feature information, one of an enter-group identifier or a join-group identifier is displayed; after the enter-group identifier is triggered, the current user attempts to enter the communication group; after the join-group identifier is triggered, the current user attempts to join the communication group. The join-group identifier and the enter-group identifier each may be a reminder icon, which is triggered by being clicked.

In some embodiments of the present disclosure, the displaying one of an enter-group identifier or a join-group identifier based on a belonging relationship between the current user inputting the first information and the communication group and feature information of the communication group comprises: if the said current user has joined the communication group associated with the target object, displaying the enter-group identifier, and entering the communication group after the enter-group identifier is triggered. In some embodiments, after the current user has joined the communication group associated with the target object, a second identifier may be triggered in a manner such as clicking, and then jump to the communication group and display a group chat interface.

In some embodiments of the present disclosure, if the current user has not joined the communication group associated with the target object and the communication group associated with the target object is a communication group created by a chatbot, the join-group identifier is displayed, and the user enters the communication group after the join-group identifier is triggered. In some embodiments, the communication group created by the chatbot may not have a group administrator or may be set to be freely joined by default. In a case where the current user does not join the communication group associated with the target object, if the communication group is a communication group created by a chatbot, the user may automatically join and enter the communication group if the join-group identifier is triggered. In some embodiments, joining the communication group means becoming a member of the communication group, and entering the communication group means opening a group chat interface of the communication group.

In some embodiments of the present disclosure, if the current user has not joined the communication group associated with the target object, and if the communication group associated with the target object is a communication group created by a user and the communication group is provided to be in an open state, the join-group identifier is displayed, and the user joins and enters the communication group after the join-group identifier is triggered. In some embodiments, the communication group created by the user refers to a communication group created by a user as a natural person, and the open state may be a joinable state, whereupon the join-group identifier is displayed, the user may join the communication group after the join-group identifier is triggered, and meanwhile may enter the communication group.

In some embodiments of the present disclosure, if the current user has not yet joined the communication group associated with the said target object, and if the communication group associated with the target object is a communication group created by a user and the communication group is provided to be in a closed state, the join-group identifier is displayed, and at least one of the following information is prompted after the join-group identifier is triggered: failure to add the current user to the communication group, group administrator information, and an approval entrance. In some embodiments, the communication group created by a user refers to a communication group created by the a user as a natural person, and the closed state may be a non-joinable state; at this time, after the join-group identifier is triggered, it is prompted that the user fails to join communication group, and contact information and the approval entrance of the group administrator may be displayed; the approval entrance may be used for submitting an application for joining the group to help the user apply to join the communication group.

In some embodiments of the present disclosure, a user satisfying a preset rule is added to the communication group in response to the communication group associated with the target object being created. In some embodiments, a preset rule is preset and used for determining a user that is automatically pulled into the communication group after the communication group is created, for example, the target object may be an internal project, and the preset rule may be adding a user with a preset function to the communication group. In some embodiments, a chatbot is added to the communication group in response to the communication group associated with the target object being created. The chatbot is a non-natural person account. The system information may be sent via the chatbot added to the communication group.

In some embodiments of the present disclosure, adding the target user satisfying the preset rule to the communication group comprises: determining the target user based on the target object and/or a type of the first information; adding the target user to the communication group. In some embodiments, the communication group is a communication group of the target object, and thus a user associated with the target object may be added to the communication group. In some embodiments, there may be more users associated with the target object, but not all the associated users are related to the first information, for example, the first information is a certain type of report in the project, whereupon only the user related to the type of report is interested in the first information. Therefore, the target user may also be determined according to the type of the first information. Certainly, the target user may also be determined in combination with both the target object and the type of the first information.

In some embodiments of the present disclosure, determining the target user based on the target object and/or the type of the first information comprises: determining candidate users associated with the target object; determining, from the candidate users, a target user associated with the type of the first information. In some embodiments, the candidate users associated with the target object are first determined according to the target object, and then the target user associated with the type of the first information is determined from the candidate users, such that the most relevant user is automatically added to the communication group after the communication group is created, without requiring the user to manually look up.

In some embodiments of the present disclosure, in response to the communication group associated with the target object being created, a second notification message is sent to the communication group associated with the target object, the second notification message informing that the target object is associated with the communication group. In some embodiments, the second notification message is sent after the communication group is created to notify users joining the communication group.

The second notification message comprises at least one of: a name of the target object, a type of the target object, a profile of the target object, a size of the target object, a location of the target object, members of the target object, an owner and a preset contact of the target object.

In some embodiments of the present disclosure, after the second notification message being triggered, opening an information page of the target object in the data system. The second notification message is triggered in a manner for example by clicking, to open the information page of the target object, thereby helping the users in the communication group to learn about the associated target object.

In some embodiments of the present disclosure, the communication group is further associated with at least one other object. In some embodiments, the communication group is configured to be associated with at least two objects such that it is convenient for associated users of different objects perform real-time collaborative communication through the communication group during collaboration. In some embodiments, other objects associated with the communication group and the target object are located in different data systems, the other objects and the target object may be located in different servers, and the communication group may be associated with objects in different servers.

In some embodiments, a group name of the communication group associated with the target object is determined according to a preset rule, e.g., the group name is determined according to the preset rule and according to the name of the target object. In order to help the user know the usage of the communication group and the associated target object, the group name of the communication group is determined according to the target object, for example, the group name may be: "the name of the target object"+"communication group".

In some embodiments, the group identifier of the communication group associated with the target object is bound to the identifier of the target object in the data system, and the group identifiers of different communication groups are different. In some embodiments, the group identifier may be a serial number of the communication group. With the group identifier being bound to the target object, the communication group associated with the target object may be determined according to the target object.

In some embodiments of the present disclosure, members of the communication group associated with the target object comprise: a chatbot; the chatbot sends notification information associated with the target object. In some embodiments, the chatbot is automatically added to the communication group; the notification messages such as a first notification message, a second notification message, a third notification message and a fourth notification message are sent via the chatbot.

In some embodiments of the present disclosure, when the related page of the target object is a page of the target object displayed in an applet: the applet performs the step of sending the first information to the data system and the step of determining the communication group associated with the target object, and the applet sends the first notification message to the communication group associated with the target object via the chatbot having joined the communication group associated with the target object. In some embodiments, the applet performs step S11 and the step of determining the communication group. The step S11 and the step of determining the communication group are not performed by the chatbot, and the chatbot performs the step of sending the first notification message in step S12; in some embodiments, the first information may be input in the applet and sent to the data system, so that the user may send the first notification message to the communication group without need to enter the communication group associated with the target object, i.e., without need to perform a lookup operation for the communication group; furthermore, since the first notification message is sent by the chatbot, there is no need for a user to join the communication group, thereby avoiding possible occurrence of privilege-related issues.

In some embodiments of the present disclosure, when the related page of the target object is a page of the target object in the data system: a predetermined module in the data system performs the step of sending the first information to the data system and the step of determining the communication group associated with the target object, and the predetermined module sends the first notification message to the communication group associated with the target object via the chatbot having joined the communication group associated with the target object. In some embodiments, the related page of the target object may be opened in the data system, and then the predetermined module in the data system performs steps S11 and S12. As such, the user does not need to join the communication group, and possible occurrence of privilege-related issues can be solved.

In some embodiments of the present disclosure, in response to a forwarding operation of a third notification message in the communication group associated with the target object, the third notification message is forwarded to a first communication object; after the third notification message forwarded to the first communication object being triggered, opening an information page of the target object in the data system and locating a position where an update corresponding to the third notification message lies.

Figure 2:
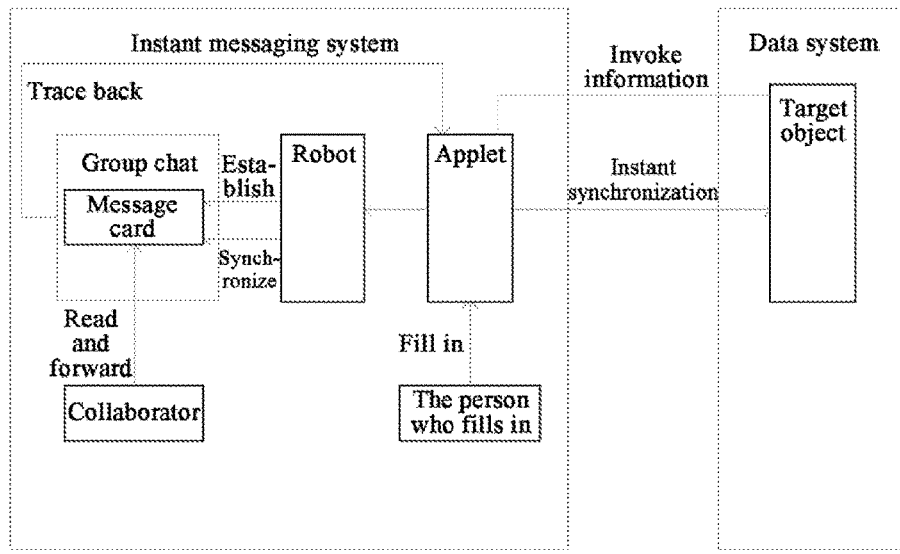
FIG. 2 is an architectural diagram of one implementation of an embodiment of the present disclosure.

In some embodiments, the third notification message may be any notification message in the communication group, such as the first notification message and the second notification message described above. The third notification message in the communication group may be forwarded to the first communication object, the first communication object may be other users or other groups, and the third notification message forwarded to the first communication object may be triggered and then open the position where the corresponding update lies In order to better illustrate the method provided in the embodiments of the present disclosure, reference is made to FIG. 2, in which the applet pre-establishes a communication connection with the data system.

Figure 3:
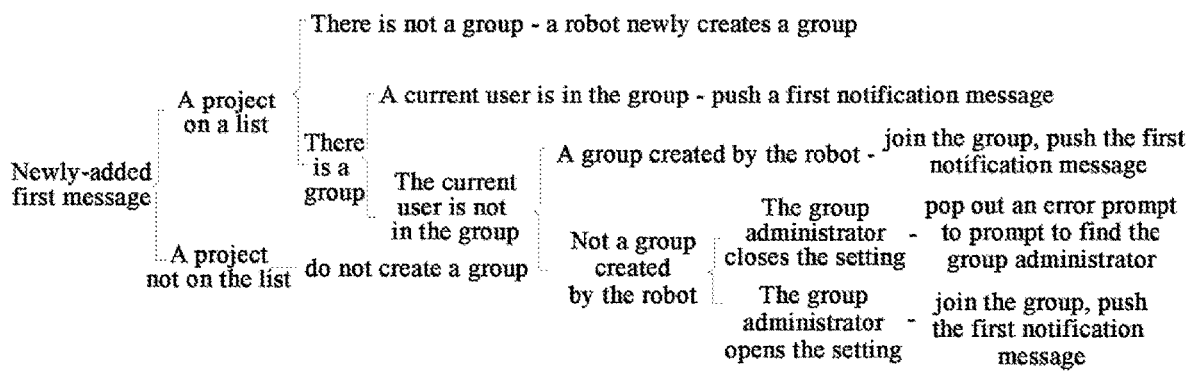
FIG. 3 is a flowchart of a method of creating a communication group according to an embodiment of the present disclosure.

In a case where first information about the target object is input into the related page of the target object displayed in the applet when the communication group is not yet established, in response to inputting the first information of the target object, the applet sends the first information to the data system to instantaneously and synchronously update association information of the target object in the data system, wherein the target object may be a certain project and the first information may be follow-up information about the project. At this time, referring to FIG. 3, firstly judgment is made as to whether the target object is a project on a list (namely, an project in a preset project list); if NO, the communication group is not created; if YES, judgment is made as to whether a communication group associated with the target object already exists; if NO, a communication group is newly created via the chatbot and bound with the target object; if a communication group associated with the target object exists, judgment is made as to whether a current user (namely, the user inputting the first information) is in the communication group; if the current user is in the communication group, the first notification message is sent to the communication group via the chatbot; if the current user is not in the communication group, the first notification message is pushed via the chatbot, and then judgment is made as to whether the communication group is a group created by the chatbot; if the communication group is a group created by the chatbot, the current user is added to the communication group and the first notification message is pushed via the chatbot; if the communication group is not a group created by the chatbot, and the group administrator closes the setting and the user cannot join the communication group, an error prompt pops out to prompt to find the group administrator; if the group administrator opens the setting and a user may join the communication group, the user joins the communication group.

Figure 4:
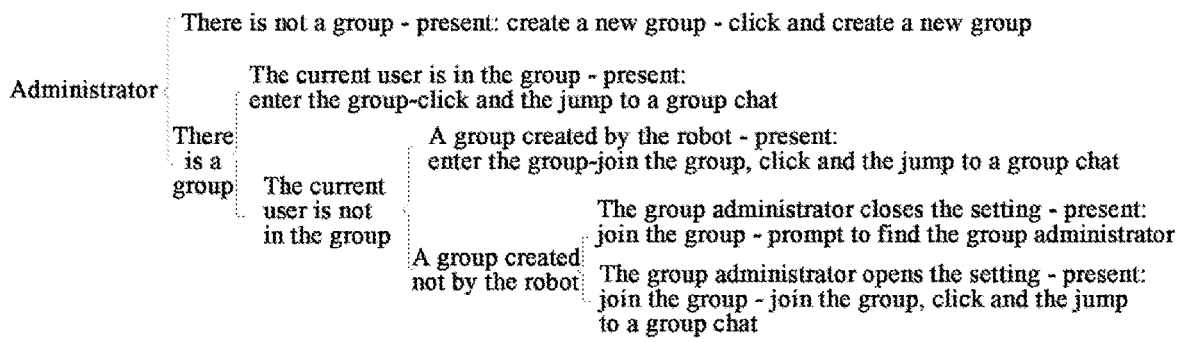
FIG. 4 is a flowchart of another method of creating a communication group according to an embodiment of the present disclosure.

In another case, the communication group may be created before the first information is input into the applet. As shown in FIG. 4, if the current user has a preset privilege, for example, if the current user is an administrator and has the preset privilege, judgment is made first to whether a communication group associated with the target object exists; if a communication group associated with the target object does not exist, a group creation identifier is displayed and a newly-created group is presented. The communication group associated with the target object is created after the group creation identifier is triggered; and if a communication group associated with the target object already exists, judgment is made as to whether the current user is in the communication group; if the current user is already in the communication group, an enter-group identifier is displayed. The enter-group identifier presents entering into the group. After the enter-group identifier is triggered, the user enters the communication group and jumps to a group chat. If the current user is not in the communication group associated with the target object, judgment is made as to whether the communication group is a group established by the chatbot; if it is a group established by the chatbot, a join-group identifier is presented to add the current user to the communication group, and jumps to a group chat after the join-group identifier is triggered. If the communication group is not a group established by the chatbot and the group administrator closes the setting and does not permit joining in, the join-group identifier is presented, and a prompt is given to find the group after the join-group identifier is triggered; if the communication group is set open, the join-group identifier is presented to add the current user to the communication group, and jumps to a group chat after the join-group identifier is triggered.

With regard to the created communication group, a chatbot and a natural-person user associated with the target object such as a project leader or a service role of the project will be automatically added into the communication group; a group name of the communication group is generated according to a preset rule, and a group ID of the communication group and an ID of the target object are bound to each other. A communication group may be associated with a plurality of objects. After the creation of the communication group is completed, the second notification message is sent to notify that the communication group is successfully created. The second notification message may take a form as shown in FIG. 5, and the information page of the target object may be accessed by triggering the second notification message.

Group members may view, discuss, and record progress of target object in the communication group. The first information input into the applet is processed into a first notification message in the form of a message card; an associated communication group is determined according to the target object, and the first notification message is pushed into the associated communication group in the form of the message card, so that users in the communication group may synchronously see the information. In a case where the association information of the target object in the data system changes, for example, core data of the project changes or updates, the applet obtains the updated information via an interface with the data system. It is possible that the applet may obtain the updated information from the data system periodically, and it is also possible that the data system actively sends an update message to the applet, and the applet sends the update message to the communication group in the form of a message card via the chatbot.

For the message card in the communication group, the message card may be forwarded to other users or groups; after the message card is triggered, a link in the message card is accessed, the information page of the target object in the data system is opened and located to a position where the update corresponding to the update message lies, thereby tracing back to the information record of the target object.

In the present embodiment, the creation of the communication group, the association of target objects and the maintenance of the communication group are realized through the chatbot; a table maintaining information synchronization rules may be employed, comprising a notification mode and a binding relationship, wherein the notification mode comprises real-time event triggering, summarization of events at regular time, and summarization of states. The input first information and the automatically-generated update message are synchronized into the communication group, the notification message is sent in the form of a message card via the chatbot, and the information page of the target object is opened via the applet after the notification message is triggered, to trace back to the information. In the embodiments of the present disclosure, through the instant synchronization, the timelines and accuracy of the information acquired by the group are improved, bidirectional communication of the group chat and the data system is achieved, and during the group chat, the system may be entered for tracing back by synchronizing the link on the card.

Embodiments of the present disclosure further provide an information processing apparatus, comprising:
 a sending unit for sending the first information to a data system, in response to inputting first information of a target object into a related page of the target object, to update association information of the target object in the data system;
 a control unit for determining a communication group associated with the target object, and sending a first notification message to the communication group associated with the target object,
 wherein the first notification message includes the first information.

Embodiments of the present disclosure further provide an information processing apparatus, wherein the related page of the target object comprises:
 a page of the target object displayed in an applet; or,
 a page of the target object in the data system.

Embodiments of the present disclosure further provide an information processing apparatus, wherein after the first notification message being triggered, opening an information page of the target object in the data system and locating a position of an update corresponding to the first notification message.

Embodiments of the present disclosure further provide an information processing apparatus, wherein determining, by the control unit, the communication group associated with the target object, and sending, by the control unit, the first notification message to the communication group associated with the target object, comprises:
 determining whether a communication group associated with the target object exists;
 if a communication group associated with the target object does not exist, creating a first class of communication group associated with the target object and sending the first notification message to the created communication group;
 if a communication group associated with the target object exists, sending the first notification message to the communication group associated with the target object.

Embodiments of the present disclosure further provide an information processing apparatus, wherein if a communication group associated with the target object exists, the method further comprises: determining whether a current user inputting the first information has already joined the communication group associated with the target object, and if NO, attempting to add the current user to the communication group associated with the target object.

Embodiments of the present disclosure further provide an information processing apparatus, wherein the attempting to add the current user to the communication group associated with the target object comprises:
if the communication group associated with the target object is a communication group created by a chatbot, adding the current user to the communication group associated with the target object; or,
if the communication group associated with the target object is a communication group created by a user and the communication group is set in an open state, adding the current user to the communication group associated with the target object; or,
if the communication group associated with the target object is a communication group created by a user and the communication group is set in a closed state, displaying reminding information, the reminding information being used for prompting at least one of the following information: failure to add the current user to the communication group, group administrator information, and an approval entrance.

Embodiments of the present disclosure further provide an information processing apparatus, wherein the control unit is further used for, before the sending unit responding to inputting the first information of the target object into the related page of the target object, determining whether communication group associated with the target object exists, in response to the current user having a first privilege about the target object; if NO, display a group creation identifier, and create the communication group associated with the target object in response to a triggering operation on the group creation identifier; or,
if YES, display one of an enter-group identifier or a join-group identifier based on a belonging relationship between the current user and the communication group and feature information of the communication group, the enter-group identifier being used for entering the communication group, and the join-group identifier being used for joining the communication group.

Embodiments of the present disclosure further provide an information processing apparatus, wherein displaying, by the control unit, one of an enter-group identifier or a join-group identifier based on a belonging relationship between the current user and the communication group and feature information of the communication group comprises:
if the current user has already joined the communication group associated with the target object, displaying the enter-group identifier, and entering the communication group after the enter-group identifier is triggered; or,
if the current user has not yet joined the communication group associated with the target object and the communication group associated with the target object is a communication group created by a chatbot, displaying the join-group identifier and joining and entering the communication group after the join-group identifier is triggered; or,
if the current user has not yet joined the communication group associated with the target object, the communication group associated with the target object is a communication group created by a user and the communication group is set in an open state, displaying the join-group identifier, and joining and entering the communication group after the join-group identifier is triggered; or,
if the current user has not yet joined the communication group associated with the target object, the communication group associated with the target object is a communication group created by a user and the communication group is set in a closed state, displaying the join-group identifier, and prompting at least one of the following information after the join-group identifier is triggered: failure to add the current user to the communication group, group administrator information, and an approval entrance.

Embodiments of the present disclosure further provide an information processing apparatus, wherein the control unit is further used for: in response to the communication group associated with the target object being created, adding a target user satisfying a preset rule to the communication group; and/or,
in response to the communication group associated with the target object being created, sending a second notification message to the communication group associated with the target object, the second notification message being used for informing that the target object is associated with the communication group.

Embodiments of the present disclosure further provide an information processing apparatus, wherein adding, by the control unit, the target user satisfying the preset rule to the communication group comprises: determining the target user according to the target object and/or a type of the first information; adding the target user to the communication group.

Embodiments of the present disclosure further provide an information processing apparatus, determining, by the control unit, a target user based on the target object and/or a type of the first information comprises: determining candidate users associated with the target object; determining, from the candidate users, the target user associated with the type of the first information.

Embodiments of the present disclosure further provide an information processing apparatus, wherein the second notification message includes an address of an information page of the target object in the data system, and after the second notification message being triggered, opening the information page of the target object in the data system; and/or,
the second notification message comprises at least one of: a name of the target object, a type of the target object, a profile of the target object, a size of the target object, a location of the target object, members of the target object, an owner and a preset contact of the target object.

Embodiments of the present disclosure further provide an information processing apparatus, wherein the association group is further associated with at least one other object.

Embodiments of the present disclosure further provide an information processing apparatus, wherein when the related page of the target object is a page of the target object displayed in an applet: the apparatus controls the applet to perform the step of sending the first information to the data system and the step of determining the communication group associated with the target object, and controls the applet to send the first notification message to the communication group associated with the target object via the chatbot having joined the communication group associated with the target object;
when the related page of the target object is a page of the target object in the data system: the apparatus controls a predetermined module in the data system to perform the step of sending the first information to the data system and the step of determining the communication group associated with the target object, and controls the predetermined module to send the first notification message to the communication group associated with the target object via the chatbot having joined the communication group associated with the target object.

Embodiments of the present disclosure further provide an information processing apparatus, wherein the control unit is further used for, in response to a forwarding operation of a third notification message in the communication group associated with the target object, forwarding the third notification message to a first communication object; after the third notification message forwarded to the first communication object being triggered, opening an information page of the target object in the data system and locating a position of an update corresponding to the third notification message.

Regarding embodiments of the apparatus, since they substantially corresponds to the embodiments of the method, reference may be made to the depictions of the embodiments of the method for relevant portions. The apparatus embodiments described above are merely illustrative, wherein the modules illustrated as separate modules may or may not be separate. Part or all of the modules may be selected according to actual needs to achieve the purposes of the solution of the present embodiment. Those having ordinary skill in the art may understand and implement the solutions without making any inventive efforts.

The method and apparatus of the present disclosure have been described above based on embodiments and application examples. In addition, the present disclosure provides a terminal and a storage medium, which are described below.

Reference is now made to FIG. 6, which illustrates a structural schematic diagram of an electronic device 800 suitable for implementing embodiments of the present disclosure. The terminals in the embodiments of the present disclosure may comprise, but are not limited to, mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), etc. and fixed terminals such as digital TVs, desktop computers, etc. The electronic device shown in FIG. 6 is merely an example and should not impose any limitations on the functionality and scope of use of embodiments of the present disclosure.

The electronic device 800 may comprise a processing device (e.g., a central processing unit, a graph processor, etc.) 801 that may perform various suitable actions and processes in accordance with a program stored in a read only memory (ROM) 802 or a program loaded from a storage device 808 into a random access memory (RAM) 803. In the RAM 803, various programs and data needed by the operation of the electronic device 800 are also stored. The processing device 801, the ROM 802, and the RAM 803 are connected to each other via a bus 804. An input/output (I/O) interface 805 is also coupled to bus 804.

In general, the following devices may be connected to the I/O interface 805: an input device 806 including, for example, a touch screen, a touch pad, a keyboard, a mouse, a camera, a microphone, an accelerometer, a gyroscope, etc.; an output device 808 including, for example, a liquid crystal display (LCD), a speaker, a vibrator, etc.; a storage device 807 including, for example, a magnetic tape, a hard disk, etc.; and a communication device 809. The communication device 809 may allow the electronic device 800 to communicate in a wireless or wired manner with other devices to exchange data. While FIG. 6 illustrates the electronic device 800 having various devices, it is to be understood that not all illustrated device are required to be implemented or provided. More or fewer devices may alternatively be implemented or provided.

In particular, the processes described above with reference to flow charts may be implemented as computer software programs in accordance with embodiments of the present disclosure. For example, embodiments of the present disclosure comprise a computer program product comprising a computer program carried on a non-transitory computer-readable medium, the computer program comprising program code for performing the method illustrated by the flow charts. In such embodiments, the computer program may be downloaded and installed from a network via the communication means 809, or installed from the storage means 808, or installed from the ROM 802. When the computer program is executed by the processing device 801, the above-described functions defined in the method of the embodiment of the present disclosure are performed.

It is appreciated that the computer-readable medium described above in the present disclosure may be either a computer-readable signal medium or a computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may comprise, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may comprise a data signal embodied in baseband or propagated as part of a carrier carrying computer-readable program code. Such propagated data signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: electrical wire, optic cable, RF (radio frequency), and the like, or any suitable combinations thereof.

In some embodiments, the terminal, server may communicate using any currently known or future-developed network protocol, such as HTTP (HyperText Transfer Protocol), and may be interconnected with any form or medium of digital data communication (e.g., a communication network). Examples of the communication network comprise local area networks ("LANs"), wide area networks ("WANs"), international networks (e.g., the Internet), and peer-to-peer networks (e.g., ad hoc peer-to-peer networks), as well as any currently known or future-developed networks.

The computer readable medium may be contained in the above-described electronic device; it may also be present separately and not installed into the electronic device.

The computer-readable medium carries one or more programs that, when executed by the electronic device, cause the electronic device to perform the above method of the present disclosure.

The computer program code for carrying out operations of the present disclosure may be written in one or more programming languages or combinations thereof. The programming languages include, but not limited to, object-oriented programming languages, such as Java, smalltalk, C++, and conventional procedural programming languages, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The units described in connection with the embodiments disclosed herein may be implemented in a software or hardware manner. The names of the units do not constitute limitations of the units themselves in a certain case.

The functions described herein above may be performed, at least in part, by one or more hardware logic components. For example, without limitation, exemplary types of hardware logic components that may be used comprise: a Field Programmable Gate Array (FPGA), an Application Specific Integrated Circuits (ASIC), an Application Specific Standard Products (ASSP), a Systems On Chip (SOC), a Complex Programmable Logic Device (CPLD), and so on.

In the context of the present disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combinations thereof. More specific examples of the machine-readable storage medium would comprise an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination thereof.

According to one or more embodiments of the present disclosure, [Example 1] provides an information processing method, comprising:
　　in response to inputting first information of a target object into a related page of the target object, sending the first information to a data system to update association information of the target object in the data system;
　　determining a communication group associated with the target object, and sending a first notification message to the communication group associated with the target object;
　　wherein the first notification message includes the first information.

According to one or more embodiments of the present disclosure, [Example 2] provides the method of [Example 1], wherein the related page of the target object comprises:
　　a page of the target object displayed in an applet; or,
　　a page of the target object in the data system.

According to one or more embodiments of the present disclosure, [Example 3]provides the method of [Example 1], wherein after the first notification message being triggered, opening an information page of the target object in the data system and locating a position of an update corresponding to the first notification message.

According to one or more embodiments of the present disclosure, [Example 4] provides the method of [Example 1], wherein determining the communication group associated with the target object, and sending the first notification message to the communication group associated with the target object, comprises:
　　determining whether the communication group associated with the target object exists;
　　if the communication group associated with the target object does not exist, creating a first class of communication group associated with the target object and sending the first notification message to the created communication group;
　　if the communication group associated with the target object exists, sending the first notification message to the communication group associated with the target object.

According to one or more embodiments of the present disclosure, [Example 5] provides the method of [Example 4], wherein if the communication group associated with the target object exists, the method further comprises: determining whether a current user inputting the first information has already joined the communication group associated with the target object, and if NO, attempting to add the current user to the communication group associated with the target object.

According to one or more embodiments of the present disclosure, [Example 6] provides the method of [Example 5], wherein the attempting to add the current user to the communication group associated with the target object comprises:
　　if the communication group associated with the target object is a communication group created by a chatbot, adding the current user to the communication group associated with the target object; or, if the communication group associated with the target object is a communication group created by a user and the communication group is provided to be in an open state, adding the current user to the communication group associated with the target object; or, if the communication group associated with the target object is the communication group created by the user and the communication group is provided to be in a closed state, displaying reminding information, the reminding information being used for prompting at least one of the following information: failure to add the current user to the communication group, group administrator information, and an approval entrance.

According to one or more embodiments of the present disclosure, [Example 7] provides the method of [Example 1], wherein before responding to inputting the first information of the target object into the related page of the target object, the method further comprises:

determining whether the communication group associated with the target object exists, in response to the current user having a first privilege about the target object;

if NO, displaying a group creation identifier, and creating the communication group associated with the target object in response to a triggering operation on the group creation identifier; or, if YES, displaying one of an enter-group identifier or a join-group identifier based on a belonging relationship between the current user and the communication group and feature information of the communication group, the enter-group identifier being used for entering the communication group, and the join-group identifier being used for joining the communication group.

According to one or more embodiments of the present disclosure, [Example 8] provides the method of [Example 7], wherein the displaying one of an enter-group identifier or a join-group identifier based on a belonging relationship between the current user and the communication group and feature information of the communication group comprises:

if the current user has already joined the communication group associated with the target object, displaying the enter-group identifier, and entering the communication group after the enter-group identifier is triggered; or, if the current user has not yet joined the communication group associated with the target object and the communication group associated with the target object is a communication group created by a chatbot, displaying the join-group identifier and joining and entering the communication group after the join-group identifier is triggered; or, if the current user has not yet joined the communication group associated with the target object, the communication group associated with the target object is a communication group created by a user and the communication group is provided to be in an open state, displaying the join-group identifier, and joining and entering the communication group after the join-group identifier is triggered; or, if the current user has not yet joined the communication group associated with the target object, the communication group associated with the target object is a communication group created by a user and the communication group is provided to be in a closed state, displaying the join-group identifier, and prompting at least one of the following information after the join-group identifier is triggered: failure to add the current user to the communication group, group administrator information, and an approval entrance.

According to one or more embodiments of the present disclosure, [Example 9] provides the method of [Example 1], wherein the method further comprises at least one of the following:

in response to the communication group associated with the target object being created, adding a target user satisfying a preset rule to the communication group;

in response to the communication group associated with the target object being created, sending a second notification message to the communication group associated with the target object, the second notification message being used for informing that the target object is associated with the communication group.

According to one or more embodiments of the present disclosure, [Example 10] provides the method of [Example 9], wherein adding the target user satisfying the preset rule to the communication group comprises:

determining the target user according to at least one of the target object and a type of the first information;

adding the target user to the communication group.

According to one or more embodiments of the present disclosure, [Example 11] provides the method of [Example 10], wherein determining the target user according to at least one of the target object and the type of the first information comprises:

determining candidate users associated with the target object;

determining, from the candidate users, the target user associated with the type of the first information.

According to one or more embodiments of the present disclosure, [Example 12] provides the method of [Example 9], wherein the method comprises at least one of the following:

the second notification message includes an address of an information page of the target object in the data system, and after the second notification message being triggered, opening the information page of the target object in the data system;

the second notification message includes at least one of: a name of the target object, a type of the target object, a profile of the target object, a size of the target object, a location of the target object, members of the target object, an owner and a preset contact of the target object.

According to one or more embodiments of the present disclosure, [Example 13] provides the method of [Example 1], wherein the communication group is further associated with at least one other object.

According to one or more embodiments of the present disclosure, [Example 14] provides the method of [Example 1], wherein in case that the related page of the target object is a page of the target object displayed in an applet: the applet performs the step of sending the first information to the data system and the step of determining the communication group associated with the target object, and the applet sends the first notification message to the communication group associated with the target object via the chatbot having joined the communication group associated with the target object;

in case that the related page of the target object is a page of the target object in the data system: a predetermined module in the data system performs the step of sending the first information to the data system and the step of determining the communication group associated with the target object, and the predetermined module sends the first notification message to the communication group associated with the target object via the chatbot having joined the communication group associated with the target object.

According to one or more embodiments of the present disclosure, [Example 15] provides the method of [Example 1], wherein the method further comprises:

in response to a forwarding operation of a third notification message in the communication group associated with the target object, forwarding the third notification message to a first communication object; after the third notification message forwarded to the first communication object being triggered, opening an information page of the target object in the data system and locating a position of an update corresponding to the third notification message.

According to one or more embodiments of the present disclosure, [Example 16] provides an information processing apparatus, comprising:

a sending unit for sending the first information to a data system to update association information of the target object in the data system in response to inputting first information of a target object into a related page of the target object;

a control unit for determining a communication group associated with the target object, and sending a first notification message to the communication group associated with the target object, wherein the first notification message includes the first information.

According to one or more embodiments of the present disclosure, [Example 17] provides an electronic device, comprising:

at least one memory and at least one processor;

wherein the at least one memory is used for storing program code, and the at least one processor is used for calling the program code stored by the at least one memory to execute the method of any one of [Example 1] through [Example 15].

According to one or more embodiments of the present disclosure, [Example 18] provides a computer-readable storage medium for storing program code that, when executed by a processor, causes the processor to perform the method of any one of [Example 1] through [Example 15].

What are described above are only preferred embodiments of the present disclosure and illustrate the technical principles employed. It will be appreciated by those skilled in the art that the scope of the present disclosure is not limited to technical solutions formed by specific combinations of the above technical features, and meanwhile should also include other technical solutions formed by any combinations of the above technical features or equivalent features thereof, for example, technical solutions formed by replacement of the above technical features with technical features having similar functions disclosed by the present disclosure.

In addition, while operations are depicted in a particular order, this should not be understood as requiring that the operations be performed in the particular order shown or in a sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

We claim:

1. An information processing method, comprising:
in response to inputting first information of a target object into a related page of the target object, sending the first information to a data system to update association information of the target object in the data system;
determining a communication group associated with the target object, and sending a first notification message to the communication group associated with the target object;
wherein the first notification message includes the first information, and determining the communication group associated with the target object, and sending the first notification message to the communication group associated with the target object, comprises:
determining whether the communication group associated with the target object exists;
in response to determining that the communication group associated with the target object exists, determining whether a current user inputting the first information has already joined the communication group associated with the target object; and
in response to determining that the current user inputting the first information has not joined the communication group associated with the target object, attempting to add the current user to the communication group associated with the target object by:
in response to the communication group associated with the target object being a communication group created by a chatbot, adding the current user to the communication group associated with the target object; or,
in response to the communication group associated with the target object being a communication group created by a user and the communication group being provided to be in an open state, adding the current user to the communication group associated with the target object; or,
in response to the communication group associated with the target object being a communication group created by a user and the communication group being provided to be in a closed state, displaying reminding information, the reminding information being used for prompting at least one of the following information: failure to add the current user to the communication group, group administrator information, or an approval entrance.

2. The method according to claim 1, wherein the related page of the target object comprises:
a page of the target object displayed in an applet; or,
a page of the target object in the data system.

3. The method according to claim 1, further comprising:
opening an information page of the target object in the data system and locating a position of an update corresponding to the first notification message after the first notification message in the communication group associated with the target object is triggered.

4. The method according to claim 1, wherein determining the communication group associated with the target object, and sending the first notification message to the communication group associated with the target object, comprises:
if the communication group associated with the target object does not exist, creating a first class of communication group associated with the target object and sending the first notification message to the created communication group.

5. The method according to claim 1, wherein before inputting the first information of the target object into the related page of the target object, the method further comprises:
determining whether the communication group associated with the target object exists in response to the current user having a first privilege about the target object;
if NO, displaying a group creation identifier, and creating the communication group associated with the target object in response to a triggering operation on the group creation identifier; or,
if YES, displaying one of an enter-group identifier or a join-group identifier based on a belonging relationship between the current user and the communication group and feature information of the communication group, the enter-group identifier being used for entering the communication group, and the join-group identifier being used for joining the communication group.

6. The method according to claim 5, wherein the displaying one of an enter-group identifier or a join-group identifier based on a belonging relationship between the current user and the communication group and feature information of the communication group comprises:
if the current user has already joined the communication group associated with the target object, displaying the enter-group identifier, and entering the communication group after the enter-group identifier is triggered; or,
if the current user has not joined the communication group associated with the target object and the communication group associated with the target object is a communication group created by a chatbot, displaying the join-group identifier and joining and entering the communication group after the join-group identifier is triggered; or,
if the current user has not joined the communication group associated with the target object, the communication group associated with the target object is a communication group created by a user and the communication group is provided to be in an open state, displaying the join-group identifier, and joining and entering the communication group after the join-group identifier is triggered; or,
if the current user has not joined the communication group associated with the target object, the communication group associated with the target object is a communication group created by a user and the communication group is provided to be in a closed state, displaying the join-group identifier, and prompting at least one of the following information after the join-group identifier is triggered: failure to add the current user to the communication group, group administrator information, and an approval entrance.

7. The method according to claim 1, wherein the method further comprises at least one of the following:

in response to the communication group associated with the target object being created, adding a target user satisfying a preset rule to the communication group;
in response to the communication group associated with the target object being created, sending a second notification message to the communication group associated with the target object, the second notification message being used for informing that the target object is associated with the communication group.

8. The method according to claim 7, wherein adding the target user satisfying the preset rule to the communication group comprises:
determining the target user according to at least one of the target object and a type of the first information;
adding the target user to the communication group.

9. The method according to claim 8, wherein determining the target user according to at least one of the target object and the type of the first information comprises:
determining candidate users associated with the target object;
determining, from the candidate users, the target user associated with the type of the first information.

10. The method according to claim 7, wherein the method comprises at least one of the following:
the second notification message includes an address of an information page of the target object in the data system, and opening the information page of the target object in the data system after the second notification message being triggered;
the second notification message includes at least one of: a name of the target object, a type of the target object, a profile of the target object, a size of the target object, a location of the target object, members of the target object, an owner and a preset contact of the target object.

11. The method according to claim 1, wherein
the communication group is further associated with at least one other object.

12. The method according to claim 2, wherein
in case that the related page of the target object is a page of the target object displayed in an applet: the applet performs the step of sending the first information to the data system and the step of determining the communication group associated with the target object, and the applet sends the first notification message to the communication group associated with the target object via the chatbot having joined the communication group associated with the target object;
in case that the related page of the target object is a page of the target object in the data system: a predetermined module in the data system performs the step of sending the first information to the data system and the step of determining the communication group associated with the target object, and the predetermined module sends the first notification message to the communication group associated with the target object via the chatbot having joined the communication group associated with the target object.

13. The method according to claim 1, wherein the method further comprises:
in response to a forwarding operation of a third notification message in the communication group associated with the target object, forwarding the third notification message to a first communication object; after the third notification message forwarded to the first communication object being triggered, opening an information page of the target object in the data system and locates a position of an update corresponding to the third notification message.

14. An electronic device, comprising:
at least one memory and at least one processor;
wherein the at least one memory is used for storing program code, and the at least one processor is used for calling the program code stored by the at least one memory to perform steps of:
   in response to inputting first information of a target object into a related page of the target object, sending the first information to a data system to update association information of the target object in the data system;
   determining a communication group associated with the target object, and sending a first notification message to the communication group associated with the target object;
wherein the first notification message includes the first information, and determining the communication group associated with the target object, and sending the first notification message to the communication group associated with the target object, comprises:
   determining whether the communication group associated with the target object exists;
   in response to determining that the communication group associated with the target object exists, determining whether a current user inputting the first information has already joined the communication group associated with the target object; and
   in response to determining that the current user inputting the first information has not joined the communication group associated with the target object, attempting to add the current user to the communication group associated with the target object by:
      in response to the communication group associated with the target object being a communication group created by a chatbot, adding the current user to the communication group associated with the target object; or,
      in response to the communication group associated with the target object being a communication group created by a user and the communication group being provided to be in an open state, adding the current user to the communication group associated with the target object; or,
      in response to the communication group associated with the target object being a communication group created by a user and the communication group being provided to be in a closed state, displaying reminding information, the reminding information being used for prompting at least one of the following information: failure to add the current user to the communication group, group administrator information, or an approval entrance.

15. The device according to claim 14, wherein the related page of the target object comprises:
   a page of the target object displayed in an applet; or,
   a page of the target object in the data system.

16. The device according to claim 14, the steps further comprising:
   opening an information page of the target object in the data system and locating a position of an update corresponding to the first notification message after the first notification message in the communication group associated with the target object is triggered.

17. The device according to claim 14, wherein determining the communication group associated with the target object, and sending the first notification message to the communication group associated with the target object, comprises:
   if the communication group associated with the target object does not exist, creating a first class of communication group associated with the target object and sending the first notification message to the created communication group.

18. A non-transitory computer-readable storage medium for storing program code that, when executed by a processor, causes the processor to perform steps of:
   in response to inputting first information of a target object into a related page of the target object, sending the first information to a data system to update association information of the target object in the data system;
   determining a communication group associated with the target object, and sending a first notification message to the communication group associated with the target object;
   wherein the first notification message includes the first information, and determining the communication group associated with the target object, and sending the first notification message to the communication group associated with the target object, comprises:
   determining whether the communication group associated with the target object exists;
   in response to determining that the communication group associated with the target object exists, determining whether a current user inputting the first information has already joined the communication group associated with the target object; and
   in response to determining that the current user inputting the first information has not joined the communication group associated with the target object, attempting to add the current user to the communication group associated with the target object by:
      in response to the communication group associated with the target object being a communication group created by a chatbot, adding the current user to the communication group associated with the target object; or,
      in response to the communication group associated with the target object being a communication group created by a user and the communication group being provided to be in an open state, adding the current user to the communication group associated with the target object; or,
      in response to the communication group associated with the target object being a communication group created by a user and the communication group being provided to be in a closed state, displaying reminding information, the reminding information being used for prompting at least one of the following information: failure to add the current user to the communication group, group administrator information, or an approval entrance.

* * * * *